United States Patent
Minagata et al.

(10) Patent No.: US 9,806,317 B2
(45) Date of Patent: Oct. 31, 2017

(54) ELECTRIC STORAGE DEVICE

(71) Applicant: KABUSHIKI KAISHA TOYOTA JIDOSHOKKI, Kariya-shi, Aichi-ken (JP)

(72) Inventors: Atsushi Minagata, Kariya (JP); Motoaki Okuda, Kariya (JP); Hiroyasu Nishihara, Kariya (JP); Takayuki Kato, Kariya (JP)

(73) Assignee: KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 262 days.

(21) Appl. No.: 14/419,112

(22) PCT Filed: Jul. 16, 2013

(86) PCT No.: PCT/JP2013/069276
§ 371 (c)(1),
(2) Date: Feb. 2, 2015

(87) PCT Pub. No.: WO2014/021094
PCT Pub. Date: Feb. 6, 2014

(65) Prior Publication Data
US 2015/0207124 A1    Jul. 23, 2015

(30) Foreign Application Priority Data
Aug. 3, 2012 (JP) .............................. 2012-173246

(51) Int. Cl.
*H01M 2/18* (2006.01)
*H01G 11/52* (2013.01)
(Continued)

(52) U.S. Cl.
CPC .............. *H01M 2/18* (2013.01); *H01G 11/16* (2013.01); *H01G 11/52* (2013.01); *H01G 11/66* (2013.01);
(Continued)

(58) Field of Classification Search
None
See application file for complete search history.

(56) References Cited

U.S. PATENT DOCUMENTS

2003/0129496 A1* 7/2003 Kasai ..................... B82Y 30/00
                                              429/231.1
2004/0096732 A1* 5/2004 Shin ..................... H01M 2/0277
                                              429/61
(Continued)

FOREIGN PATENT DOCUMENTS

CN    102623740 A    8/2012
EP    2 482 368 A1   8/2012
(Continued)

OTHER PUBLICATIONS

Communication dated Feb. 3, 2015, issued by the International Searching Authority in counterpart Application No. PCT/JP2013/069276.
(Continued)

*Primary Examiner* — Jeremiah Smith
(74) *Attorney, Agent, or Firm* — Sughrue Mion, PLLC (57) ABSTRACT

The electric storage device disclosed herein is a stacked type electric storage device. The electric storage device includes a separator insulating a first electrode from a second electrode. The electric storage device includes a first conductive path from a first electrode terminal to the first electrode, a second conductive path from a second electrode terminal to the second electrode, and a current interruption device disposed between the second electrode terminal and the second electrode, the current interruption device being configured to interrupt the second conductive path. The separator includes a first surface part covering the one surface of the first electrode, a second surface part covering the other surface of the first electrode, and a connection part connected to both the first and second surface parts. The (Continued)

connection part is disposed between the current interruption device and an end of the first electrode on a current interruption device side.

9 Claims, 9 Drawing Sheets

(51) Int. Cl.

| | | |
|---|---|---|
| *H01G 11/66* | (2013.01) | |
| *H01M 2/26* | (2006.01) | |
| *H01M 10/0525* | (2010.01) | |
| *H01M 10/0585* | (2010.01) | |
| *H01G 11/16* | (2013.01) | |
| *H01M 2/16* | (2006.01) | |
| *H01M 2/30* | (2006.01) | |
| *H01M 2/34* | (2006.01) | |
| *H01M 10/42* | (2006.01) | |
| *H01M 10/0587* | (2010.01) | |
| *H01M 2/12* | (2006.01) | |

(52) U.S. Cl.
CPC ......... *H01M 2/1673* (2013.01); *H01M 2/266* (2013.01); *H01M 2/30* (2013.01); *H01M 2/34* (2013.01); *H01M 10/0525* (2013.01); *H01M 10/0585* (2013.01); *H01M 2/1229* (2013.01); *H01M 2/1247* (2013.01); *H01M 2/345* (2013.01); *H01M 10/0587* (2013.01); *H01M 10/4235* (2013.01); *H01M 2200/00* (2013.01); *H01M 2200/20* (2013.01); *Y02E 60/13* (2013.01)

(56) References Cited

U.S. PATENT DOCUMENTS

| | | | |
|---|---|---|---|
| 2008/0305398 A1* | 12/2008 | Komiya | H01M 6/005 429/246 |
| 2009/0081530 A1* | 3/2009 | Hashimoto | H01M 2/0225 429/56 |
| 2010/0081052 A1* | 4/2010 | Morishima | H01M 2/263 429/211 |
| 2011/0052949 A1 | 3/2011 | Byun et al. | |
| 2012/0196172 A1 | 8/2012 | Maeda et al. | |

FOREIGN PATENT DOCUMENTS

| | | |
|---|---|---|
| JP | 07-105932 A | 4/1995 |
| JP | 07-254401 A | 10/1995 |
| JP | 2003-092100 A | 3/2003 |
| JP | 2004-111186 A | 4/2004 |
| JP | 2004-172085 A | 6/2004 |
| JP | 2006-156064 A | 6/2006 |
| JP | 2007-250319 A | 9/2007 |
| JP | 2011-054561 A | 3/2011 |
| JP | 2011-238357 A | 11/2011 |
| JP | 2012-028008 A | 2/2012 |

OTHER PUBLICATIONS

International Search Report for PCT/JP2013/069276 dated Sep. 3, 2013 [PCT/ISA/210].

Written Opinion for PCT/JP2013/069276 dated Sep. 3, 2013 [PCT/ISA/237].

* cited by examiner

ELECTRIC STORAGE DEVICE

CROSS REFERENCE TO RELATED APPLICATIONS

This application is a National Stage of International Application No. PCT/JP2013/069276 filed Jul. 16, 2013, claiming priority based on Japanese Patent Application No. 2012-173246 filed Aug. 3, 2012, the contents of all of which are incorporated herein by reference in their entirety.

TECHNICAL FIELD

The present application claims priority under Japanese Patent Application No. 2012-173246 filed on Aug. 3, 2012, the entire contents of which are incorporated herein by reference. A technology disclosed in this specification relates to an electric storage device.

BACKGROUND ART

An electric storage device may be mounted with a current interruption device to improve safety. Japanese Patent Application Publication No. H07-254401 A (1995) discloses an electric storage device mounted with a current interruption device configured to interrupt electric current when pressure inside an outer can rises. This electric storage device has an electrode group including a sheet-like positive electrode, a sheet-like separator, and a sheet-like negative electrode. The separator is disposed in such a state as to be sandwiched between the positive electrode and the negative electrode. A planar part of the positive electrode and a planar part of the negative electrode are in close contact with the separator. Contrary to this, each end of the positive electrode and the negative electrode is not in close contact with the separator, but are exposed to a space inside the outer can. The current interruption device of this electric storage device is provided on a conductive path between either the positive electrode or the negative electrode and a terminal plate serving as an external connection terminal. The current interruption device has a current interruption valve having conductivity. Electric current flows through this current interruption valve during charging or discharging. When pressure inside the outer can increases, the current interruption valve is actuated such that no electric current flows through the current interruption valve.

In the electric storage device of Japanese Patent Application Publication No. H7-254401 A (1995), the current interruption device and the electrodes are altogether disposed in the outer can. The current interruption device and the electrodes are placed in predetermined mounting positions in the outer can so that short circuit can be prevented from being caused by the current interruption device and the electrodes making contact with each other.

SUMMARY OF INVENTION

However, in the electric storage device of Japanese Patent Application Publication No. H07-254401 A, if inadvertent external force is applied to the outer can for example, there is a possibility that the outer can may deform thereby causing components inside thereof to be moved from the initial mounting positions. In this case, there is a possibility that the current interruption device connected to one of the electrodes and an end of the other electrode may make contact with each other and thus cause short circuit.

This specification provides a technology for reducing the possibility of a short circuit in an electric storage device.

This specification discloses an electric storage device. The electric storage device is a stacked type. The electric storage device includes a case. The electric storage device includes a sheet-like first electrode disposed within, the case and a sheet-like second electrode disposed within the case, wherein a polarity of the second electrode is different from that of the first electrode. The electric storage device includes a separator insulating the first electrode from the second electrode. The electric storage device includes a first electrode terminal and a second electrode terminal provided on the case. The electric storage device includes a first conductive path from the first electrode terminal to the first electrode and a second conductive path from the second electrode terminal to the second electrode. The electric storage device includes a current interruption device disposed between the second electrode terminal and the second electrode in the case, the current interruption device being configured to interrupt the second conductive path. In the electric storage device, one surface of the first electrode faces one surface of the second electrode. In the electric storage device, the separator includes a first surface part covering the one surface of the first electrode, a second surface part covering the other surface of the first electrode, and a connection part connected to both the first surface part and the second surface part. In the electric storage device, the connection part is disposed between the current interruption device and an end of the first electrode on a current interruption device side.

In the above-mentioned electric storage device, the connection part, which serves as an insulator, of the separator is disposed between the current interruption device electrically connected to the second electrode and the first electrode. For this reason, even if the first electrode and the current interruption device are moved from the initial mounting positions, the connection part, which serves as an insulator, can prevent the first electrode and the current interruption device from making contact with each other. This prevents the first electrode and the second electrode from being short-circuited via the second conductive path and the current interruption device.

The electric storage device disclosed herein makes it possible, to reduce the possibility of the electric storage device being short-circuited even when the case is subjected to inadvertent external force.

DESCRIPTION OF EMBODIMENTS

Hereinbelow, some of preferred technical aspects of below embodiments disclosed in the description will be listed. The features described individually have technical utility.

(Characteristic 1) In the electric storage device disclosed herein, a separator may cover a surface of a first electrode, and may be larger than the surface of the first electrode.

In the electric storage device, the first electrode is enclosed by the separator. This makes it possible to handle the first electrode and the separator as a single entity when the electric storage device is assembled. For this reason, the work of assembling the electric storage device can be made more efficient.

(Characteristic 2) In the electric storage device disclosed herein, the first electrode may include a sheet-like first metal foil. The second electrode may include a sheet-like second metal foil. In the electric storage device, the first metal foil may include a first tab protruding from an edge of the first metal foil toward an outside of the first metal foil. In the electric storage device, the second metal foil may include a second tab protruding from an edge of the second metal foil toward an outside of the second metal foil. In the electric storage device, the first tab and the second tab may be directed toward a same direction within the electric storage device.

In the electric storage device, the tabs of the first and second metal foils are directed toward a same direction in the electric storage device. For this reason, the volume of a space between an electrode assembly and a case can be made smaller than it is in a case where the tabs of the first and second metal foils are directed toward different directions with respect to the electrode assembly. This makes it possible to suppress an increase in size of the electric storage device.

(Characteristic 3) The electric storage device disclosed herein is a lithium-ion secondary battery and the first electrode may be a positive electrode and the second electrode may be a negative electrode. In the electric storage device, the second electrode may cover the first electrode, and may be larger than the first electrode.

In the electric storage device, an area of the negative electrode is larger than that of the positive electrode. For this reason, lithium ions having moved in a direction toward the negative electrode during charging are easily occluded by the negative electrode. This makes it possible to suppress a deposition of metal lithium at the negative electrode. Meanwhile, in the electric storage device, the positive electrode having a smaller area is covered by the separator. For this reason, a length by which the separator protrudes from an edge of the electrode can be made smaller than it is in a case where the negative electrode is covered by the separator, and thus an increase in size of the electric storage device can be suppressed. For these reasons, the electric storage device makes it possible to suppress the deposition of metal lithium while suppressing the increase in size of the electric storage device.

First Embodiment

Figure 1:
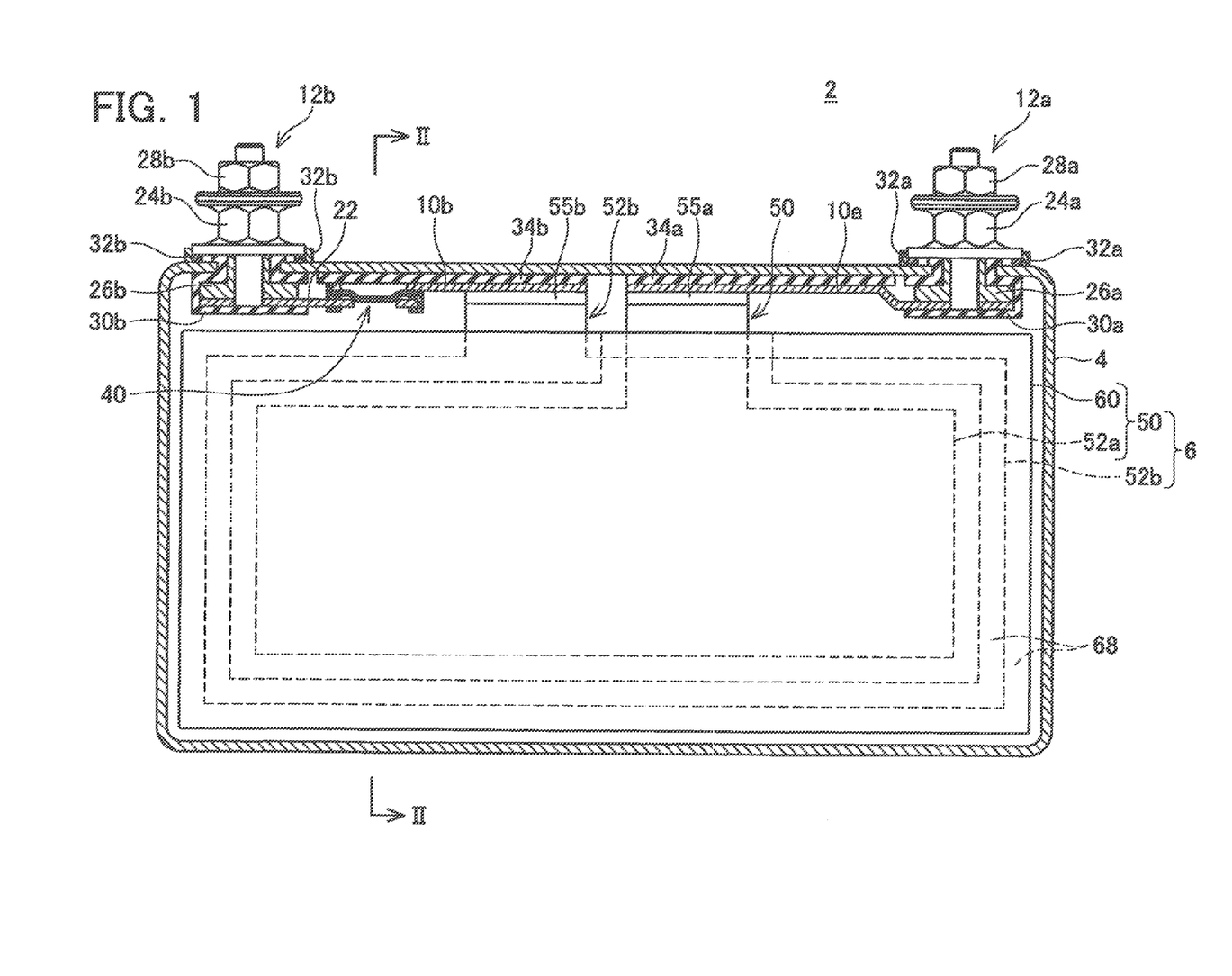
FIG. 1 is a front cross-sectional view of an electric storage device 2 of an embodiment.

FIG. 1 shows an overall configuration of an electric storage device 2 of the present embodiment. The electric storage device 2 includes: a case 4; an electrode assembly 6 housed in the case 4; a positive electrode terminal 12a and a negative electrode terminal 12b that are provided in the case 4; and a current interruption device 40 provided within the case 4.

The case 4 is made of metal and is substantially rectangular parallelepiped in shape. The positive electrode terminal 12a is provided on an upper wall of the case 4 at a right-side edge of FIG. 1, and the negative electrode terminal 12b is provided on the upper wall of the case 4 at a left-side edge of FIG. 1. The positive electrode terminal 12a and the negative electrode terminal 12b are electrically connected to positive electrodes 52a and negative electrodes 52b within the case 4, respectively (as will be described in detail later). The positive electrode 52a will be described in detail later with reference to FIGS. 3 and 4, and the negative electrode 52b will be described in detail later with reference to FIGS. 5 and 6. Wiring members (not illustrated) for charging and discharging the electric storage device 2 are connected to the positive electrode terminal 12a and the negative electrode terminal 12b.

As shown in FIG. 1, the positive electrode terminal 12a includes a bolt 24a made of metal, an inner nut 26a made of metal, and an outer nut 28a made of metal. The bolt 24a and the inner nut 26a hold the case 4 with a seal washer 32a put therebetween. The bolt 24a and the inner nut 26a are insulated from the case 4 by an insulator 30a. The outer nut 28a is used for wire connection with the wiring member.

The negative electrode terminal 12b includes a bolt 24b made of metal, an inner nut 26b made of metal, and an outer nut 28b made of metal. The bolt 24b and the inner nut 26b hold the case 4 with a seal washer 32b put therebetween. The bolt 24b and the inner nut 26b are insulated from the case 4 by an insulator 30b. The outer nut 28b is used for wire connection with the wiring member.

Figure 2:
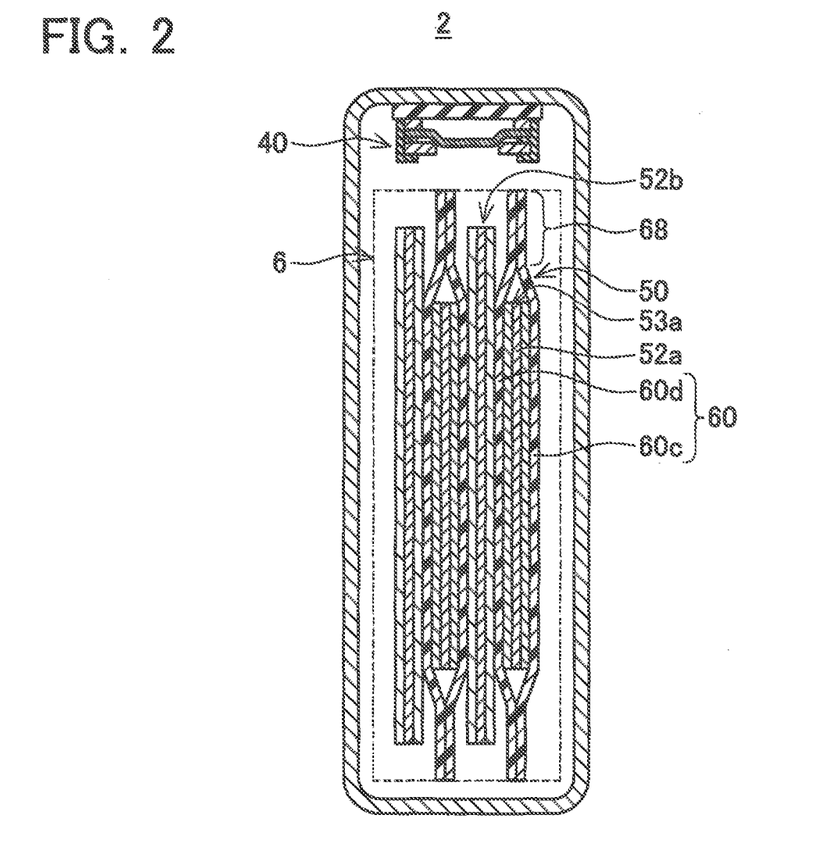
FIG. 2 is a side cross-sectional view of the electric storage device 2 of the embodiment.

As shown in FIG. 2, the electrode assembly 6 has positive electrode separator assemblies 50 including the positive electrodes 52a, and the negative electrodes 52b. The positive electrode separator assemblies 50 and the negative electrodes 52b are alternately disposed, and are stacked. The electric storage device 2 is a stacked type electric storage device. The electrode assembly 6 will be described in detail later.

The electrode assembly 6 is immersed in an electrolyte. The electrolyte contains supporting salt including lithium salt in solvent. FEC (fluoroethylene carbonate) can be used for the solvent for example. LiPF6 (lithium hexafluorophosphate) can be used for the supporting salt for example.

As shown in FIG. 1, the positive electrodes 52a, a first lead 10a, and the positive electrode terminal 12a are connected in sequence to form a conductive path (first conductive path) that connects the positive electrodes 52a and the positive electrode terminal 12a, which serves as a first positive electrode terminal. An insulator 34a is disposed between an upper surface of the first lead 10a and an inner surface of the upper wall of the case 4. The negative electrodes 52b, a second lead 10b, the current interruption device 40, a third lead 22, and the negative electrode terminal 12b, which serves as a second electrode terminal, are connected in sequence to form a second conductive path that connects the negative electrodes 52b and the negative electrode terminal 12b. The current interruption device 40 can switch this conductive path from a state in which electric current flows through the conductive path to a state in which no electric current flows through the conductive path.

The current interruption device 40 is provided on the inner surface of the upper wall of the case 4. An insulator 34b is disposed between an upper surface of the second lead 10b and the inner surface of the upper wall of the case 4 and between a top end of the current interruption device 40 and the inner surface of the upper wall of the case 4. The current interruption device 40 is a pressure-sensitive current interruption device. In a case where the pressure inside the case 4 is less than a current interruption pressure value, the current interruption device 40 is in a state in which electric current flows through the conductive path between the negative electrodes 52b and the negative electrode terminal 12b. Further, in a case where the pressure inside the case 4 is equal to or greater than the current interruption pressure value, the current interruption device 40 is in a state in which no electric current flows through the conductive path between the negative electrodes 52b and the negative electrode terminal 12b.

Figure 7:
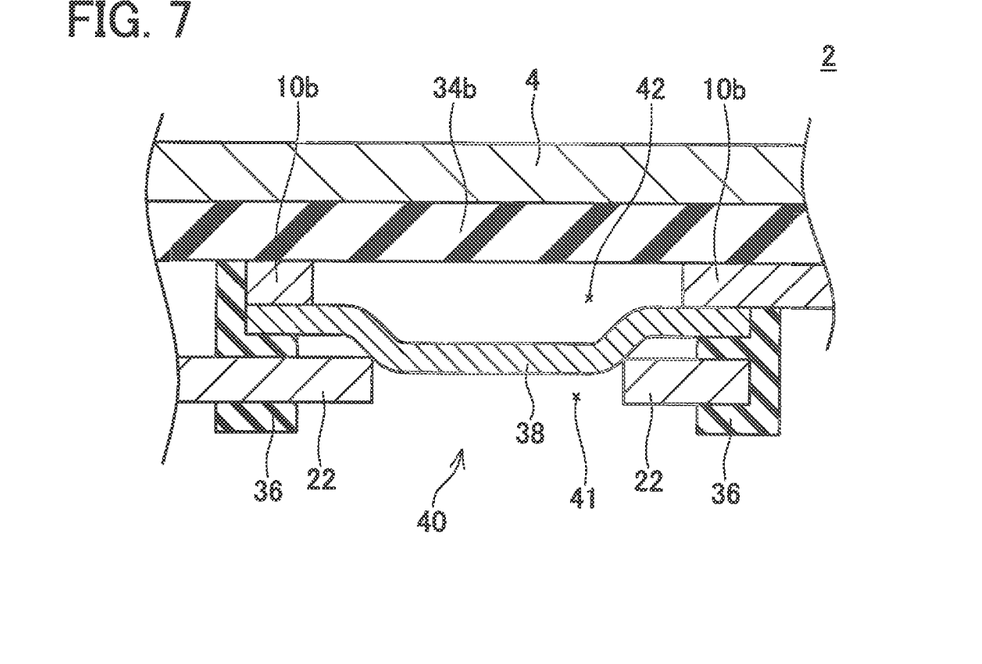
FIG. 7 is a partial cross-sectional front view of an current interruption device 40 in a case where pressure inside a case is low.

In the following, the current interruption device 40 is described in detail. As shown in FIG. 7, the current interruption device 40 has a diaphragm 38. The diaphragm 38 is a conductive diaphragm that is in the shape of a circle as viewed from an top side of FIG. 7. A periphery part of the diaphragm 38 is held between the second lead 10b and an insulator 36. The periphery part of the diaphragm 38 and the second lead 10b are in contact, and are electrically connected to each other. The third lead 22 is supported by the insulator 36 below the diaphragm 38. The periphery part of the diaphragm 38 and the third lead 22 are insulated from each other by the insulator 36. The diaphragm 38 has its lower surface subjected to pressure of a space 41 within the case 4. The diaphragm 38 has its upper surface subjected to the pressure in a space 42, which is isolated from the space within the case 4. The diaphragm 38 can switch between a state shown in FIG. 7 (in which the diaphragm 38 is bulged downward) and a state shown in FIG. 8 (in which the diaphragm 38 is bulged upward) in accordance with the pressure in the space 41.

Figure 8:
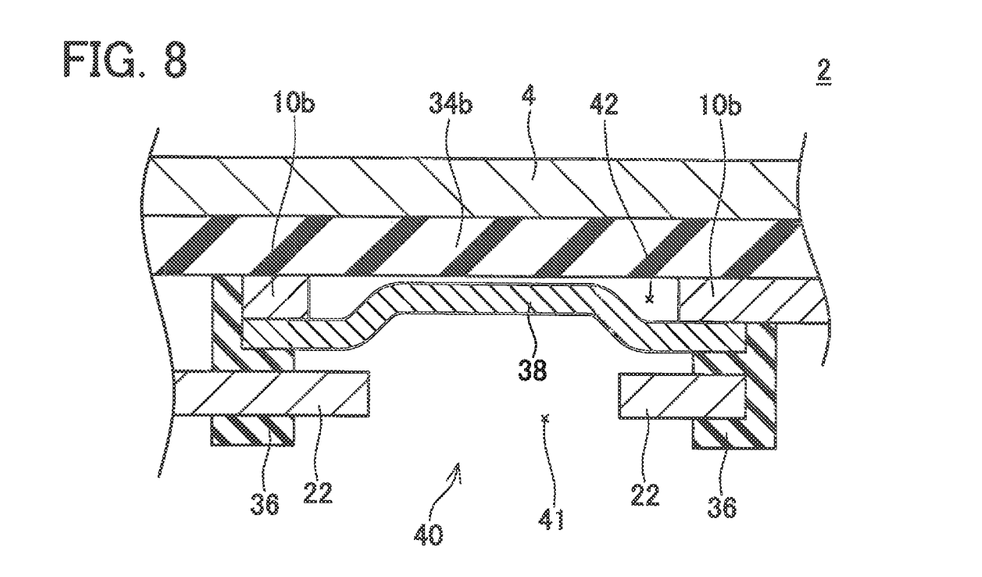
FIG. 8 is a partial cross-sectional front view of the current interruption device 40 in a case where the pressure inside the case is high.

That is, in a case where the pressure inside the case 4 is less than the current interruption pressure value, the diaphragm 38 is placed in such a state as to be bulged downward (FIG. 7). In this case, a portion of the diaphragm 38 that is bulged downward and the third lead 22 make contact with each other, and are electrically connected. The electrical connection between the third lead 22 and the diaphragm brings about a state in which electric current flows through the conductive path between the negative electrodes 52b and the negative electrode terminal 12b. In a case where the pressure inside the case 4 rises to become equal to or greater than the current interruption pressure value, the diaphragm 38 is placed in such a state as to be bulged upward (FIG. 8). In this case, the diaphragm 38 and the third lead 22 are separated from each other such that the diaphragm 38 and the third lead 22 are electrically insulated from each other. The insulation of the diaphragm 38 and the third lead 22 brings about a state in which no electric current flows through the conductive path between the negative electrodes 52b and the negative electrode terminal 12b. As shown in FIGS. 7 and 8, the current interruption device 40 has its diaphragm 38 exposed toward the inside of the case 4 (toward the lower side when viewed in FIG. 7).

Figure 3:
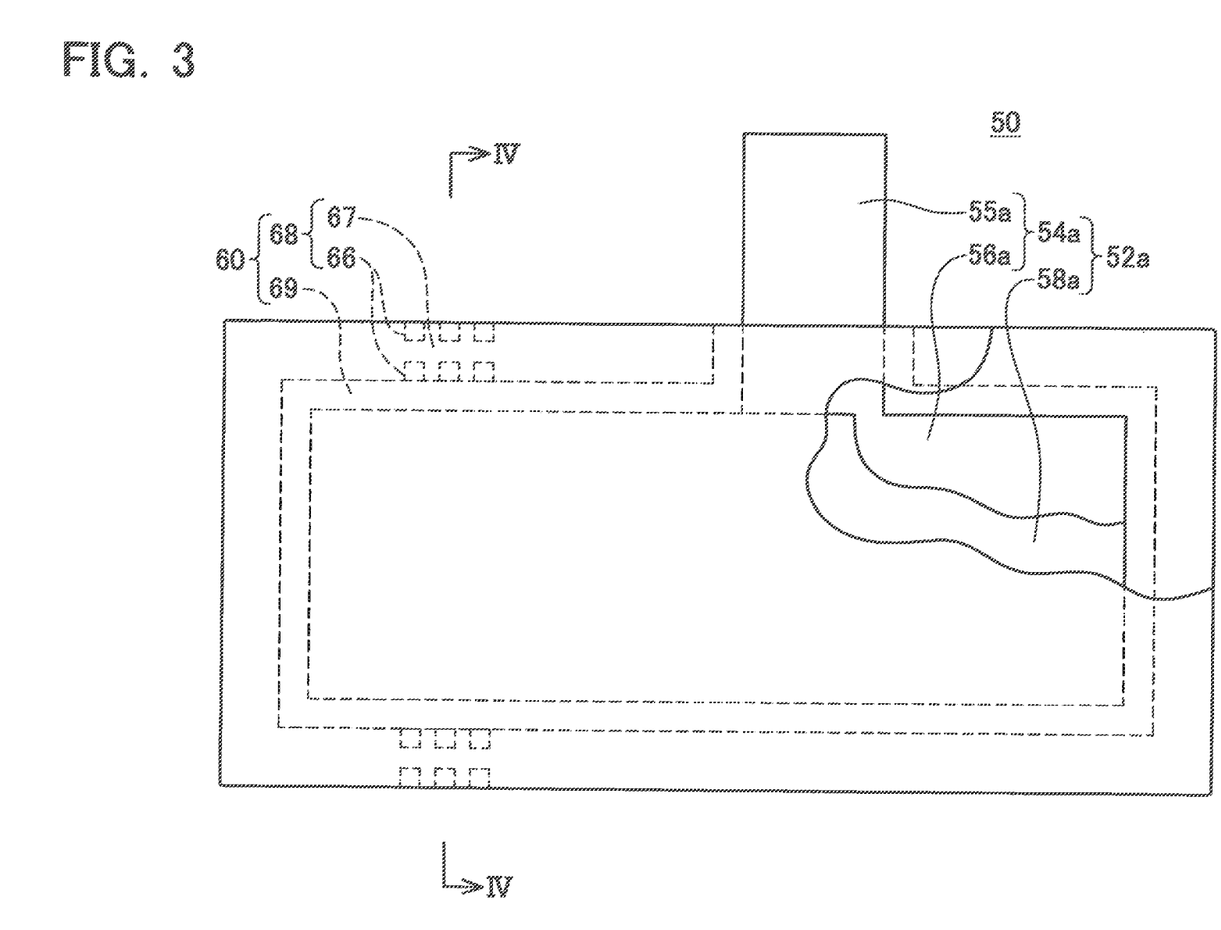
FIG. 3 is a front view of a positive electrode separator assembly 50 of the electric storage device 2 of the embodiment.
Figure 4:
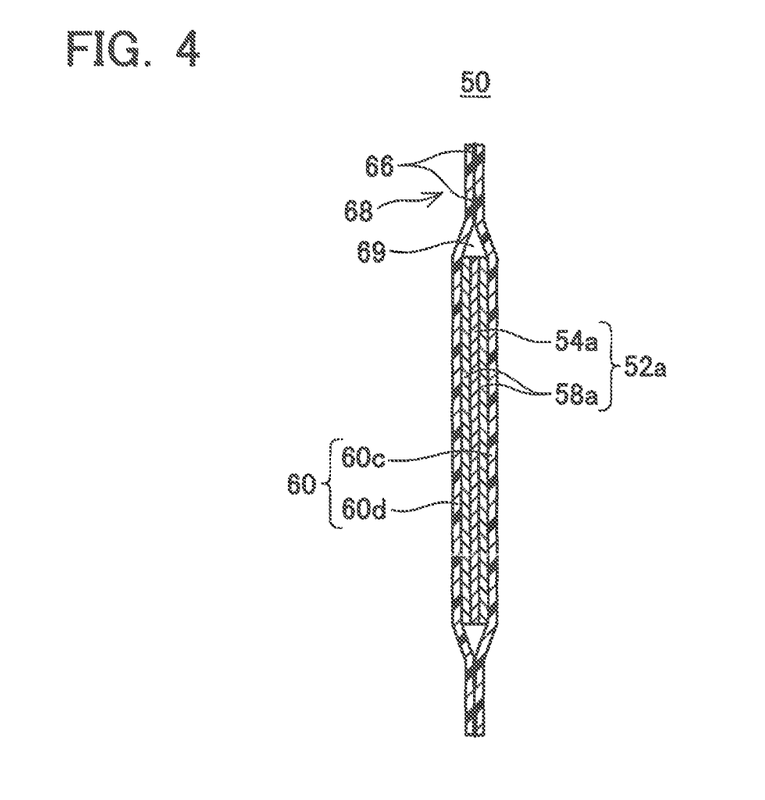
FIG. 4 is a side cross-sectional view of the positive electrode separator assembly 50 of the electric storage device 2 of the embodiment.

Next, the electrode assembly 6, the positive electrodes 52a, and the negative electrodes 52b are described in detail. The electrode assembly 6 is formed by stacking a plurality of positive electrode separator assemblies 50 and a plurality of negative electrodes 52b in sequence (FIG. 2). Each of the positive electrode separator assemblies 50 has a bag-like separator 60 and the positive electrode 52a disposed in an internal space 69 in the bag-like separator 60 (FIGS. 3 and 4).

The positive electrode 52a is formed by a positive electrode metal foil 54a and positive electrode active material layers 58a. The positive electrode metal foil 54a is made, for example, of aluminum (Al). The positive electrode metal foil 54a has a rectangular body portion 56a and a positive electrode tab 55a extending in an upward direction of FIG. 3 from the body portion 56a. The positive electrode active material layers 58a are formed on both surface parts of the body portion 56a. A usable example of the positive electrode active material layers 58a is a mixed material containing a lithium complex oxide (such as $LiCoO_2$, $LiNiO_2LiMn_2O_4$, $Li_2MnO_3$ or the like). As shown in FIG. 1, a plurality of positive electrode tabs 55a extending from the respective positive electrode metal foils 54a are bundled and fixed to a lower surface of the first lead 10a.

The bag-like separator 60 is formed by two sheet-like separators 60c and 60d. The separators 60c and 60d are made of porous insulating resin. Usable examples of the insulating resin are polypropylene, polyethylene, a composite material thereof, etc. As shown in FIG. 3, the area of each of the separators 60c and 60d is larger than the area of the body portion 56a of the positive electrode metal foil 54a. When viewed from the front of FIG. 3, the separators 60c and 60d are disposed so that the body portion 56a is situated inside of the separators 60c and 60d. The separators 60c and 60d are disposed on both sides of the positive electrode (FIG. 4). A junction region 68 is formed at ends of the separators 60c and 60d. In the junction region 68, the separators 60c and 60d are joined so as to be united. The separators 60c and 60d are not joined to each other at middle parts of the separators 60c and 60d, and the internal space 69 is formed between the separators 60c and 60d.

The junction region 68 has welded regions 66 in which the separators 60c and 60d are welded and a non-welded region 67 in which the separators 60c and 60d are not welded. A usable example of a welding method herein is ultrasonic welding. As shown in FIG. 3, when viewed from the front, each of the welded regions 66 is substantially square in shape and the non-welded region 67 is formed in an area around the welded regions 66. The non-welded region 67 extends, for example, from a separator end to the internal space. The electrolyte can satisfactorily move between the internal space 69 in the bag-like separator 60 and the space outside the internal space 69 through the non-welded region 67. Each of the positive electrodes 52a is disposed in the internal space 69. In the state in which the positive electrode 52a is disposed in the internal space 69, the separators 60c and 60d surround the positive electrode 52a.

Figure 5:
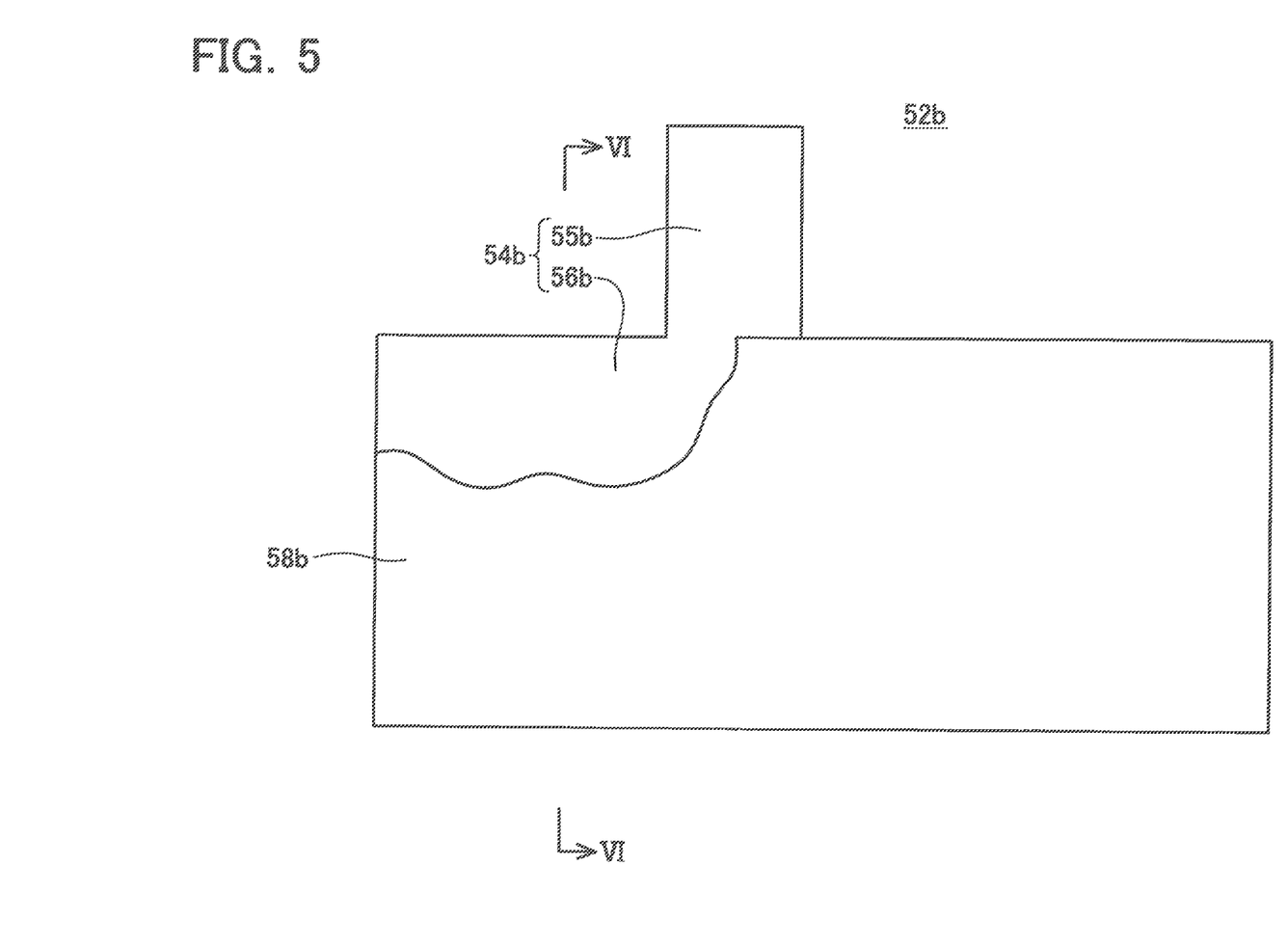
FIG. 5 is a front view of a negative electrode 52b of the electric storage device 2 of the embodiment.
Figure 6:
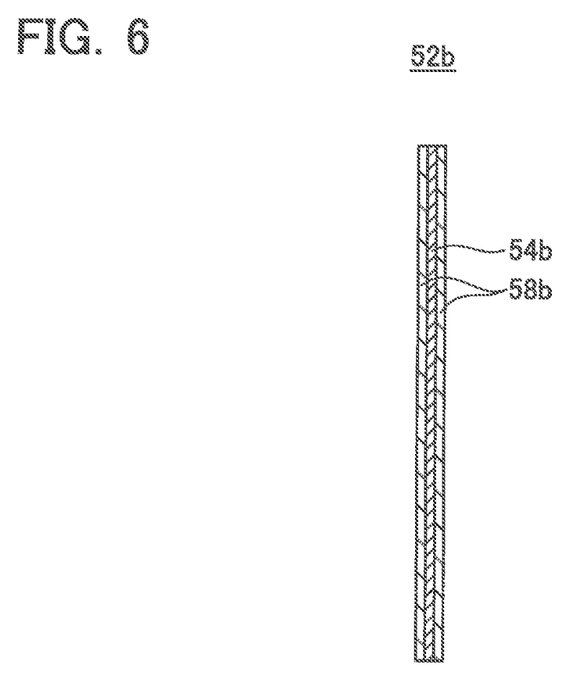
FIG. 6 is a side cross-sectional view of the negative electrode 52b of the electric storage device 2 of the embodiment.

As shown in FIGS. 5 and 6, each of the negative electrodes 52b is configured by a negative electrode metal foil 54b and negative electrode active material layers 58b. The negative electrode metal foil 54b is made, for example, of copper (Cu). The negative electrode metal foil 54b has a rectangular body portion 56b and a negative electrode tab 55b extending from the body portion 56b in an upward direction of FIG. 5. The negative electrode active material layers 58b are formed on both surfaces of the body portion 56b. The negative electrode active material layers 58b are a mixed material containing a carbon-based material such as graphite. As shown in FIG. 1, a plurality of negative electrode tabs 55b extending from the respective negative electrode metal foils 54b are bundled and fixed to a lower surface of the second lead 10b.

The tabs 55a of the positive electrodes 52a and the tabs 55b of the negative electrodes 52b are disposed on a same side (on the upper side when viewed in FIG. 1) with respect to the electrode assembly 6. For this reason, the volume of a space between the electrode assembly 6 and the case 4 can be made smaller than it is in a case where the tabs 55a and 55b are disposed toward different directions with respect to the electrode assembly 6. This makes it possible to suppress the increase in size of the electric storage device 2.

As shown in FIGS. 1 and 2, the area of each negative electrode 52b is made to be larger than the area of each positive electrode 52a. When the electric storage device 2 is viewed from the front (in a state as shown in FIG. 1), the outer periphery of the positive electrode 52a is situated on an inside of the outer periphery of the negative electrode 52b. Further, the outer periphery of the negative electrode 52b is situated on an inside of the outer periphery of the bag-like separator 60. The outer periphery of the bag-like separator 60 is made to be larger than the outer periphery of the positive electrode 52a, which is disposed in the bag-like separator 60, by a width so as to accommodate the junction region 68. In the electric storage device 2, each bag-like separator 60 is provided to each positive electrode 52a, of which outer periphery is smaller. For this reason, the outer periphery of the bag-like separator 60 can be made smaller than it is in a case where the bag-like separator 60 is used for the negative electrode 52b, of which outer periphery is larger. This makes it possible to suppress the increase in size of the electric storage device 2.

When the electric storage device 2 is assembled, the electrode assembly 6 is formed by stacking a plurality of positive electrode separator assemblies 50 and a plurality of negative electrodes 52b in sequence. In the electric storage device 2 of the present embodiment, the positive electrode 52a is enclosed by the bag-like separator 60. This makes it possible to handle the positive electrode 52a and the separators 60c and 60d together as a single entity when the electric storage device 2 is assembled. The work of assembling the electric storage device 2 can be made more efficient than it is in a case where the positive electrode 52a and the separators 60c and 60d are handled separately.

In the electrode assembly 6, as shown in FIG. 2, the separators 60c and 60d forming the bag-like separator 60 are disposed between each negative electrode 52b and each positive electrode 52a. Lithium ions contained in the electrolyte permeate the separators 60c and 60d, which are porous. During discharging of the electric storage device 2, lithium ions are occluded by the positive electrodes 52a, and lithium ions are emitted from the negative electrodes 52b. During charging of the electric storage device 2, lithium ions are emitted from the positive electrodes 52a, and lithium ions are occluded by the negative electrodes 52b. In the electric storage device 2 of the present embodiment, the area of the negative electrode 52b is larger than the area of the positive electrode 52a. For this reason, during charging, lithium ions emitted from the positive electrodes 52a are easily occluded by the negative electrodes 52b. This makes it possible to suppress a deposition of metal lithium at the negative electrodes 52b.

In the electric storage device 2, the junction region 68 is disposed between the current interruption device 40 connected to one of the electrodes (i.e. to the negative electrode 52b) and an end 53a of the other electrode (positive electrode 52a) on a current interruption device 40 side (upper side). For this reason, even if the case 4 deforms and causes the current interruption device 40 and the other electrode (positive electrode 52a) to come close to each other, the current interruption device 40 and the positive electrode 52a can be prevented from making contact with each other. This allows the electric storage device 2 to reduce the possibility of short circuit in the electric storage device 2. That is, even if the areas of the positive electrode metal foil 54a and the positive electrode active material layers 58a in the positive electrode 52a are widened, the existence of the junction region 68 between the positive electrode 52a and the current interruption device 40 can reduce the possibility of short circuit when the positive electrode 52a makes contact with the current interruption device 40, which is a negative electrode potential. This makes it possible to increase battery capacity per unit volume.

The above mentioned effect achieved by the separators 60c and 60d forming the electrode assembly 6. The electric storage device 2 of the present embodiment makes it possible to reduce the possibility of short circuit in the electric storage device 2 without providing an insulator other than the separators 60c and 60d.

Correspondences between the terms used in the embodiment and those used in claims are explained. The bag-like separator 60 is an example of the "separator". The junction region 68 is an example of the "connection part" in the claims, and parts other than the junction region 68 of the separators 60c and 60d are examples of the "first surface part" and the "second surface part".

In the above embodiment, the bag-like separator 60 is formed by the two separators 60c and 60d being joined to each other at the junction region 68. However, the bag-like separator 60 may alternatively be formed by folding a single separator and joining one end thereof to another. In the above embodiment, the "first surface part" and the "second surface part" are parts other than the junction region 68 of the two separators 60c and 60d. However, the "first surface part" and the "second surface part" may alternatively be surface parts of a single separator that face each other across a folded portion formed by folding the single separator. In the embodiment, the "connection part" is the junction region 68 formed by the two separators 60c and 60d being joined to each other. However, the "connection part" may be a folded part formed by folding a single separator.

Figure 9:
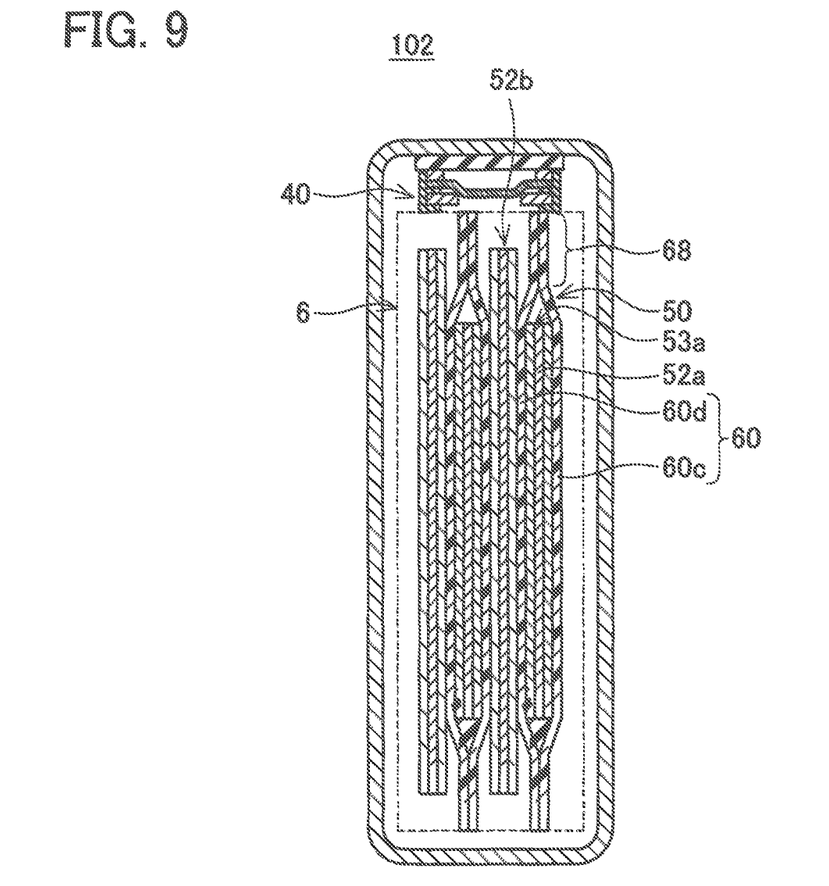
FIG. 9 is a side cross-sectional view of an electric storage device 102 of a first modification; cation.

In the following, first and second modifications of the embodiment are described. In the electric storage device 2 of the embodiment, there is a clearance between the junction regions 68 and the current interruption device 40 (see FIG. 2). However, the junction regions 68 and the current interruption device 40 may be so close to each other as to be almost in contact with each other, or may be actually in contact with each other. For example, in an electric storage device 102 of the first modification shown in FIG. 9, the junction regions 68 and the current interruption device 40 are in contact with each other. Since each junction region 68 is an insulator as mentioned above, it does not cause short circuit even if the region 68 makes contact with the current interruption device 40. Further, since the junction region 68 is welded, the insulation between the positive electrode 52a and the negative electrode 52b and the insulation between the positive electrode 52a and the current interruption device are maintained more easily than they are in a case where the separators 60c and 60d are independent of each other, even if the current interruption device 40 and the junction region 68 make contact with each other. Further, in this case, the increase in battery capacity per unit volume can be achieved by further widening the areas of the positive electrode metal foil 54*a* and the positive electrode active material layers 58*a* of the positive electrode 52*a*.

Figure 10:
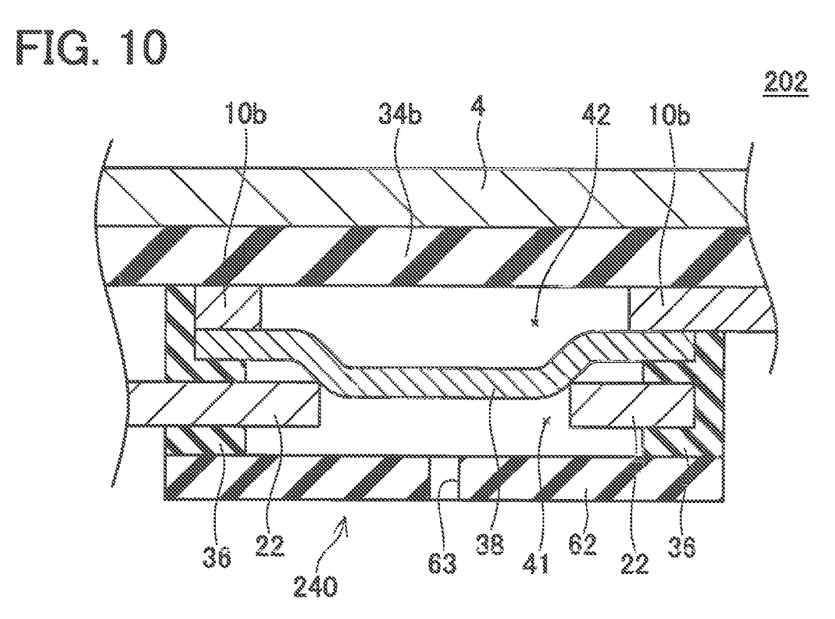
FIG. 10 is a side cross-sectional view of a current interruption device 240 of an electric storage device 202 of a second modification.

An electric storage device 202 of the second modification includes a current interruption device 240 (FIG. 10). The current interruption device 240 is one obtained by adding a protective plate 62 to the current interruption device 40 of the embodiment. The protective plate 62 is fixed to a lower side of the insulator 36. The protective plate 62 is located between the diaphragm 38 of the current interruption device 240 and the electrode assembly 6, and covers the diaphragm 38. In order for the diaphragm 38 to be easily subjected to internal pressure inside the case 4, the protective plate 62 may be provided with a through-hole 63 passing through the space 41 in the case 4 and a space between the diaphragm 38 and the protective plate 62. If a distance between the junction region 68 and the diaphragm 38 is shortened, inadvertent contact of the junction region 68 with the diaphragm 38 may cause a change in a pressure at which the diaphragm 38 is actuated. Such a malfunction due to the contact of the junction region 68 with the diaphragm 38 can be prevented by installing the protective plate 62. It should be noted that the protective plate 62 may be an insulator or a conductor. Even when the protective plate 62 is a conductor, no short circuit will be caused between the diaphragm 38 and the junction region 68, which is an insulator. It should be noted that, if the protective plate 62 is an insulator, the protective plate 62 and the insulator 36 can be made as a single member.

Specific examples of the present invention have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

The invention claimed is:

1. A stacked type electric storage device comprising:
   a case;
   a sheet-like first electrode disposed within the case;
   a sheet-like second electrode disposed within the case, wherein a polarity of the second electrode is different from that of the first electrode;
   a separator insulating the first electrode from the second electrode;
   a first electrode terminal and a second electrode terminal provided on the case;
   a first conductive path from the first electrode terminal to the first electrode;
   a second conductive path from the second electrode terminal to the second electrode; and
   a current interruption device disposed between the second electrode terminal and the second electrode in the case, the current interruption device being configured to interrupt the second conductive path,
   wherein
      one surface of the first electrode faces one surface of the second electrode,
      the separator includes: a first surface part covering the one surface of the first electrode, a second surface part covering the other surface of the first electrode, and a connection part connected to both the first surface part and the second surface part,
      the connection part is disposed between the current interruption device and an end of the first electrode on a current interruption device side, and
      the connection part contacts a surface of the current interruption device.

2. The stacked type electric storage device according to claim 1, wherein
   the separator covers the surface of the first electrode, and is larger than the surface of the first electrode.

3. The stacked type electric storage device according to claim 2, wherein
   the first electrode includes a sheet-like first metal foil,
      the second electrode includes a sheet-like second metal foil,
      the first metal foil includes a first tab protruding from an edge of the first metal foil toward an outside of the first metal foil,
      the second metal foil includes a second tab protruding from an edge of the second metal foil toward an outside of the second metal foil, and
      the first tab and the second tab are directed toward a same direction within the electric storage device.

4. The stacked type electric storage device according to claim 1, wherein
   the first electrode includes a sheet-like first metal foil,
      the second electrode includes a sheet-like second metal foil,
      the first metal foil includes a first tab protruding from an edge of the first metal foil toward an outside of the first metal foil,
      the second metal foil includes a second tab protruding from an edge of the second metal foil toward an outside of the second metal foil, and
      the first tab and the second tab are directed toward a same direction within the electric storage device.

5. The stacked type electric storage device according to claim 1, wherein the current interruption device comprises a flexible conductive diaphragm that contacts an electrical lead when a pressure inside the case is below a threshold value.

6. The stacked type electric storage device according to claim 1, wherein there is no intervening structure between one end of the connection part and the current interruption device.

7. A lithium-ion secondary battery comprising: a case;
   a sheet-like positive electrode disposed within the case;
   a sheet-like negative electrode disposed within the case, wherein a polarity of the negative electrode is different from that of the positive electrode;
   a separator insulating the positive electrode from the negative electrode;
   a positive electrode terminal and a negative electrode terminal provided on the case;
   a first conductive path from the positive electrode terminal to the positive electrode;
   a second conductive path from the negative electrode terminal to the negative electrode; and
   a current interruption device disposed between the negative electrode terminal and the negative electrode in the case, the current interruption device being configured to interrupt the second conductive path, wherein
   one surface of the positive electrode faces one surface of the negative electrode,
   the separator includes: a first surface part covering the one surface of the positive electrode, a second surface part covering the other surface of the positive electrode, and a connection part connected to both the first surface part and the second surface part, the connection part is disposed between the current interruption device and an end of the positive electrode on a current interruption device side, the connection part contacts a surface of the current interruption device, and the negative electrode covers the positive electrode, and is larger than the positive electrode.

8. The stacked type electric storage device according to claim 7, wherein the current interruption device comprises a flexible conductive diaphragm that contacts an electrical lead when a pressure inside the case is below a threshold value.

9. The stacked type electric storage device according to claim 7, wherein there is no intervening structure between one end of the connection part and the current interruption device.

* * * * *